United States Patent [19]

Müller

[11] Patent Number: 4,610,130
[45] Date of Patent: Sep. 9, 1986

[54] APPARATUS FOR PICKING UP PLANT MATERIAL LYING ON THE GROUND

[76] Inventor: Paul E. Müller, Herdernstrasse 16, 8004 Zurich, Switzerland

[21] Appl. No.: 615,991

[22] Filed: May 31, 1984

[30] Foreign Application Priority Data

Jun. 8, 1983 [CH] Switzerland .............. 3131/83

[51] Int. Cl.$^4$ ............................................. A01D 78/10
[52] U.S. Cl. ...................................... 56/370; 56/365
[58] Field of Search .............. 56/365, 367, 370, 366, 56/DIG. 1, 192

[56] References Cited

U.S. PATENT DOCUMENTS

| 4,184,313 | 1/1980 | Broijl et al. | 56/370 |
| 4,203,277 | 5/1980 | Kaetzel | 56/370 |
| 4,218,867 | 8/1980 | Kaetzel | 56/370 |
| 4,453,376 | 6/1984 | Wattron et al. | 56/370 |

FOREIGN PATENT DOCUMENTS 2066034 7/1981 United Kingdom ............ 56/370

Primary Examiner—Robert Peshock
Assistant Examiner—John G. Weiss
Attorney, Agent, or Firm—Thomas W. Speckman

[57] ABSTRACT

A device for picking up plant material lying on the ground having several driven cylindrical rotors that are provided on their bottom portions with a conical collar. Replaceable elements are fastened to the collar and serve to probe the ground, pick up plant material lying on the ground, and transport it to one side and in the direction of travel of the apparatus. Transporting ribs on the collar improve the operation. The elements subject to wear are replaceable after a certain period of operation.

16 Claims, 13 Drawing Figures

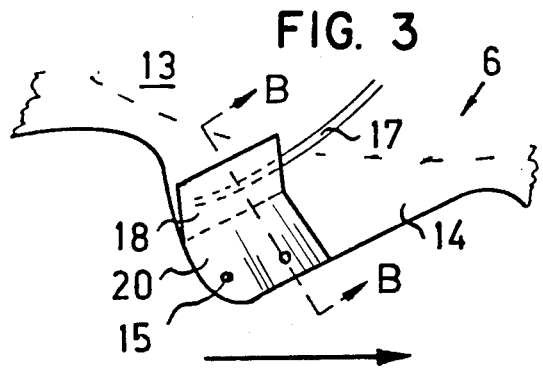
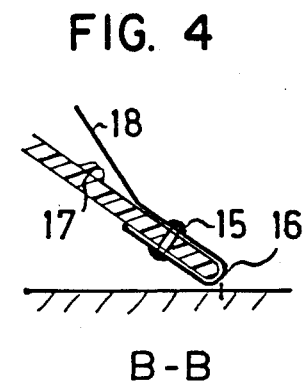
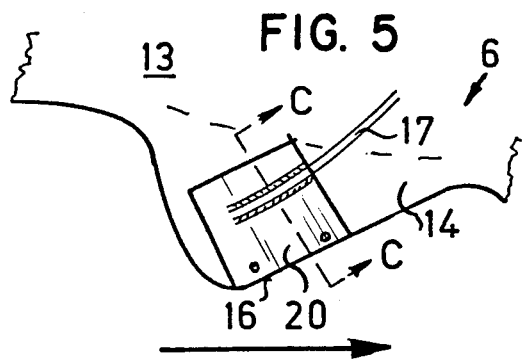
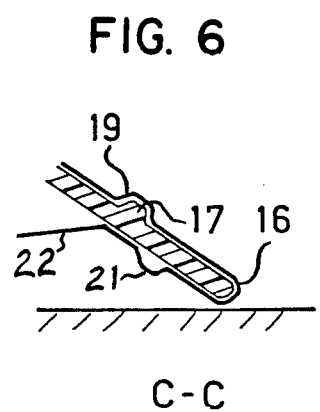
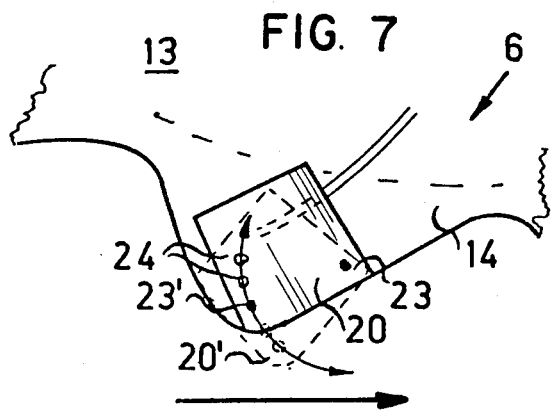

APPARATUS FOR PICKING UP PLANT MATERIAL LYING ON THE GROUND

BACKGROUND OF THE INVENTION

1. Field of the Invention

The present invention relates to an apparatus for picking up plant material lying on the ground, having at least one rotor revolving around a vertical axis, the rotor having a collar on its lower end.

2. Description of the Prior Art

In the past, plant material lying on the ground was tedded by haying machines of various types or laid down in windrows. Windrows were collected by pick-up machines and compressed by presses into bales, or conveyed to a truck, or processed in a chopper. All the prior devices, whether driven by a power take-off or traction driven, have one thing in common: they are fitted with spring steel prongs that probe the ground and transport the plant material.

All the prior devices have an important drawback: the spring steel prongs that work and transport the plant material have only a limited life. This is due to the strains to which the prongs are subjected by the unevenness of the ground and the plant material to be transported. These elements may break unnoticed during operation and a part of the element, usually composed of spring steel, gets into the harvested crop where it is practically undetectable. The next processing machine, whether it is a press or a chopper or the like, suffers severe damage from these hardened metal parts and requires expensive repairs.

This serious problem has been recognized and recently devices of the kind described above that operate without prongs, have been marketed.

FIG. 1 shows a device illustrating the state of the art. The apparatus attached to a 3-point hitch of a tractor comprises essentially a crossbeam with a divided drive shaft, driven by a power take-off, which causes three drum-shaped rotors to rotate. On the bottom of the rotors there are collars made of flexible material that probe the ground, pick up the plant material and, in interaction with conveyor elements, move it back to the side so that a windrow is formed.

However, this device when utilized as a haying machine has the great disadvantage that the conical collar is expensive and is quickly worn down due to constant contact with the ground and plant material. This wear, which is especially noticeable on the periphery of the flexible collar, also affects the quality of the work of the device and especially its ability to pick up and transport plant material. The user should not be expected to have to keep replacing this expensive part as a unit.

SUMMARY OF THE INVENTION

It is an objective of the present invention to better protect the collar against wear, and at the same time improve its ability to pick up plant material, probe the ground and transport plant material.

The apparatus according to this invention achieves this objective by attaching to the collar a plurality of parts that are subject to wear and are individually replaceable.

The various shapes of the parts and their manner of operation are fully described below.

Various embodiments of the invention are shown as examples in simplified form in the attached drawings. The invention is susceptible to additional embodiments and many details of the invention may be varied considerably without departing from the basic principles of the invention.

BRIEF DESCRIPTION OF THE DRAWINGS

FIG. 3 is a top partial view of the collar with a cap-like ground probing and plant material pick-up element;

FIG. 4 is the same element in cross section along line B—B in FIG. 3;

FIG. 5 is a top view of another embodiment of a ground probing and plant material pick-up element;

FIG. 6 is a section along line C—C in FIG. 5;

FIG. 7 is a top view of an adjustable ground probing and plant material pick-up element;

DESCRIPTION OF THE PREFERRED EMBODIMENTS

Figure 1:
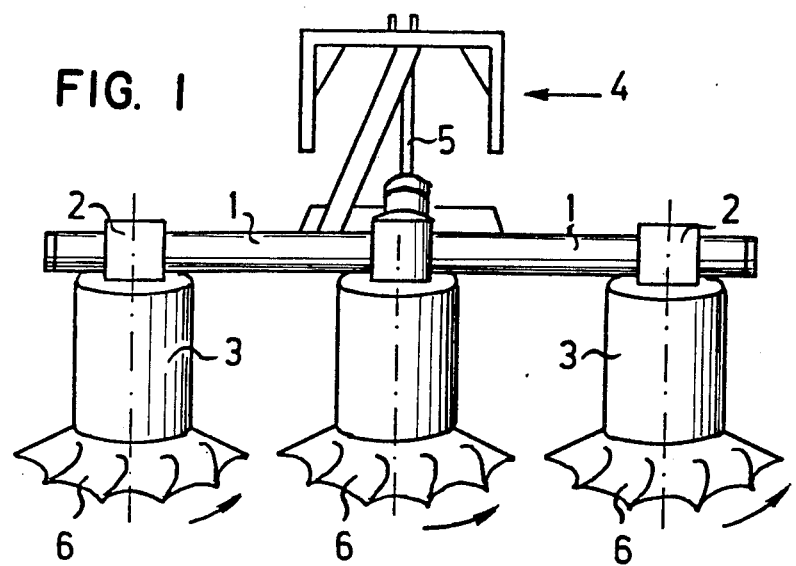
FIG. 1 is a rear view of an apparatus which illustrates a state of the art device.

The state of the art attachment to a haying machine is shown in FIG. 1. Divided drive shaft 1 drives rotors 3 through gears 2. The whole apparatus is connected by means of three-point hitch 4 to a tractor, not shown. The tractor also drives drive shaft 1 by means of power take-off 5. The apparatus may be powered by traction drive or by belts. At the bottom of rotors 3, close to the ground, collars 6 are attached which perform multiple functions of probing the ground, picking up the plant material, and transporting it. Transport of plant material takes place both in the direction of motion and to one side, as shown in the drawing, to the left.

Figure 2:
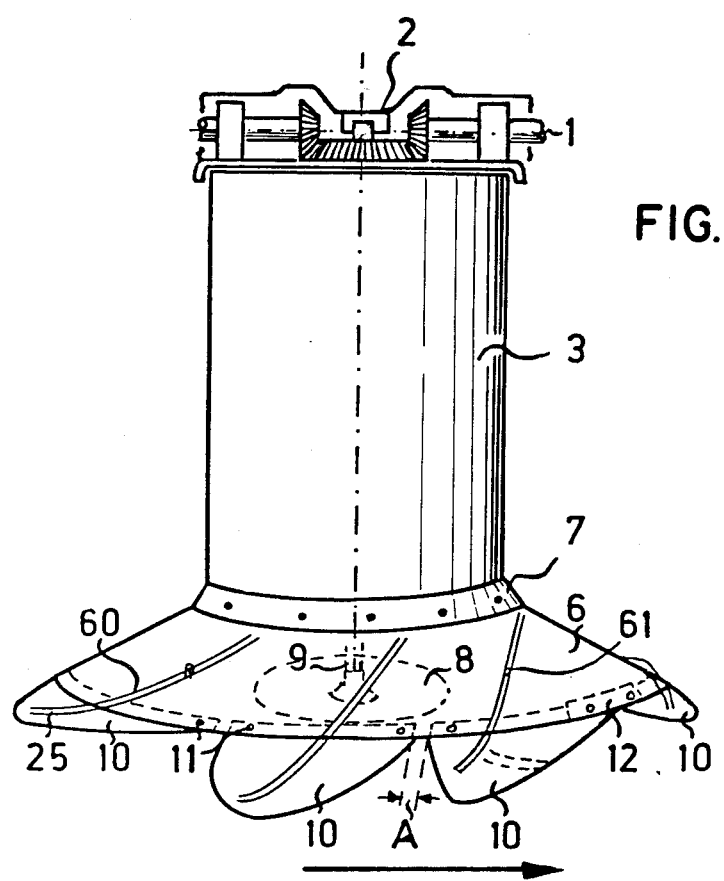
FIG. 2 is a side view of rotor with a collar having replaceable ground probing and plant material pick-up elements according to this invention.

Single rotor 3 is shown in FIG. 2. As described above, it is driven by means of gear 2. Flexible outwardly directed collar 6 is replaceably attached to rotor 3 on truncated cone-shaped extension 7. The rough probing of the ground is done by support disk 8 connected to central shaft 9 under collar 6.

A plurality of replaceable elements 10 may be attached to the periphery of collar 6. In accordance with their function, they are hereinafter referred to as gound probing and plant material pick-up elements, or more briefly, probing and pick-up elements 10. In this variation, flexible elements may easily follow the irregularities of the ground, but they are relatively rigid in the direction of the plane of rotation. Probing and pick-up elements may be attached in many different ways; by bolts or rivets, by adhesives, or by means of a ring clamp arranged on the collar. The distance between attachment points 11, as well as the distance A between two adjacent probing and pick-up elements 10 must be large enough to allow for vertical movement of elements 10 and collar 6 without tearing collar 6. Also, flexible connecting piece 12 of tear-resistant material may be provided on collar 6 between two adjacent attachment points 11, or all the way around the edge of collar 6, to prevent damage to collar 6 from collisions with solid objects such as stones.

Collar 6 need not comprise flexible material. If, as described above, support disk 8 is provided to roughly probe the ground, it is sufficient if elements 10 are flexible enough to perform the fine probing.

Ground probing and plant material pick-up elements 10 may comprise various materials. It is essential only that the material can be "processed" without damage by the next machines, if any.

If both collar 6 and elements 10 are of relatively rigid material, it is, of course, necessary that the connections between collar 6 and elements 10 be flexible or mobile.

Elements 10 have a fin-like shape, as shown in FIG. 2. A conventional collar 6 has outer portion 13 in the form of a conical frustum which has a corrugated edge and also has fin-like projecting parts 14.

Replaceable ground probing and plant material pick-up elements according to the invention are indicated as 20 in FIGS. 3-7.

Elements 20 are fitted like caps over fin-like projecting parts 14. As shown in FIGS. 3 and 4, element 20 is replaceably mounted on fin-like projecting parts 14 by attachment means 15, such as bolts or rivets.

Elements 20 may be easily retrofitted on machines equipped with a presently used collar. Front edge 16 of the collar, which is especially exposed to wear from friction, is protected by element 20. Element 20 simultaneously protects the ends of guide ribs 17 provided on fin-like projecting parts 14 which extend along collar 6 up to rotor 3. In the embodiment of FIGS. 3 and 4, guide ribs 17 are protected by inclined plane 18 rising in the counter-rotation direction. These parts and the interaction of the parts, will be more fully discussed below.

In the embodiment according to FIGS. 5 and 6, guide rib 17 is protected by congruently shaped cover 19, and also provides extra support for element 20.

The underside of element 20 shown in FIGS. 5 and 6 is also provided with guide ribs 21 that conduct any plant material coming under the collar centrifugally outwards, but function mainly as a support bead and, together with downwardly angled slide surface 22 improve the ground probing capabilities. In particular, these elements ensure the rotor and elements 20 or fin-like parts 14 mix as little earth as possible into the plant material in case of high bearing pressure.

The slightly modified embodiment of FIG. 7 has element 20 which can be mounted in different positions on collar 6. Element 20 is, in this embodiment, arranged to pivot around attachment point 23 and several holes 24 forming an arc around point 23, make it possible to attach element 20 in various positions, such as at 20', using second attachment point 23'. Depending upon the type and weight of plant material, improved pick-up of plant material may be effected by adjusting the attachment point.

Figure 8:
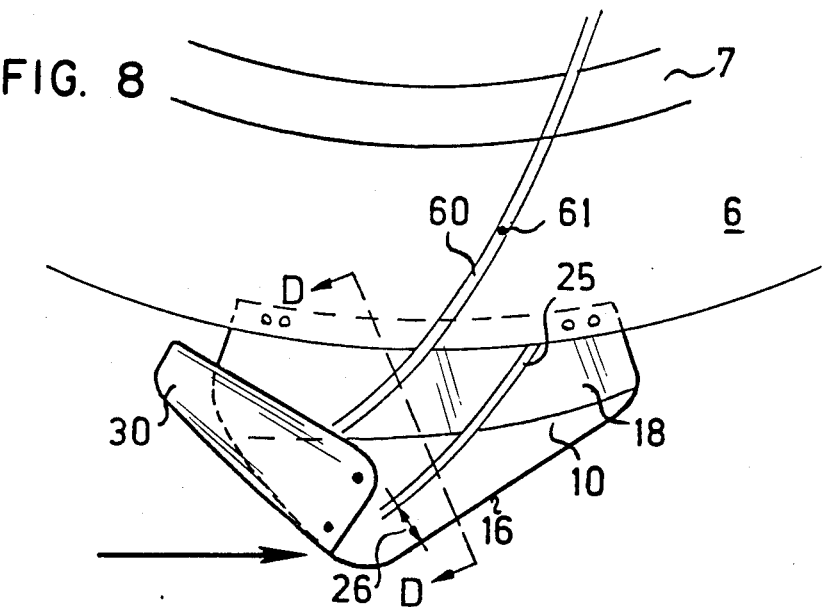
FIG. 8 is a top view of a replaceable ground probing and plant material pick-up element in combination with plant material transporting elements.
Figure 9:
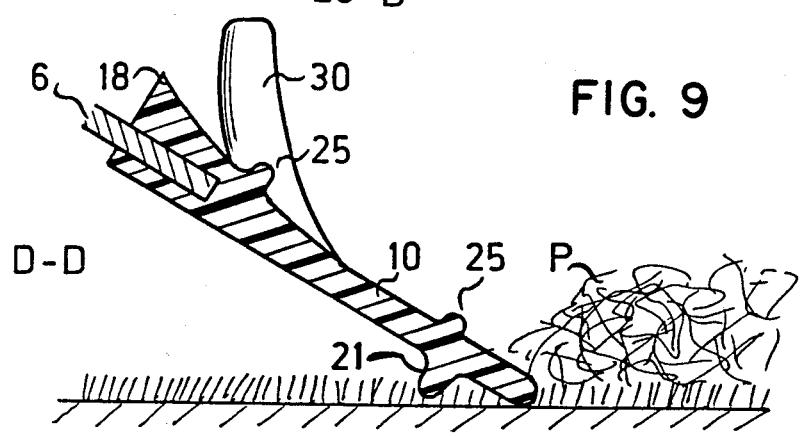
FIG. 9 is a section along line D—D in FIG. 8.
Figure 10:
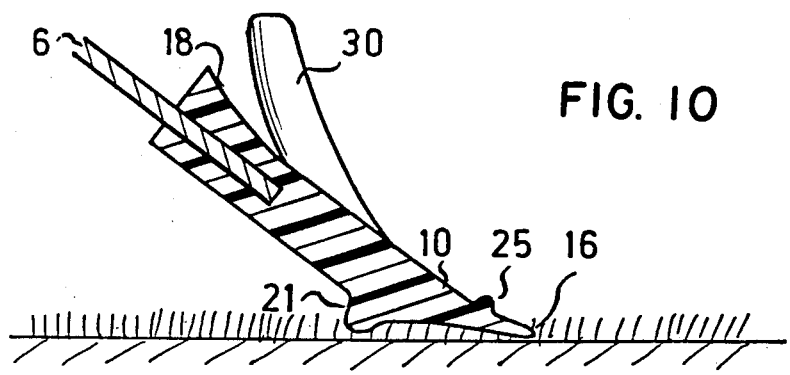
FIG. 10 is a section of another embodiment of a pick-up element.

FIGS. 8-10 show ground probing and plant material pick-up element 10 replaceably attached to collar 6.

Elements 10 are here provided with transporting ribs 25. The transporting rib nearest leading edge 16 must, however, be at a minimum distance 26 from the leading edge, to make possible collection of plant material P by element 10. Transporting ribs 25 may also be aligned with transporting ribs 60 which are likewise removably installed on collar 6. Although transporting ribs 25 are represented in the examples shown as part of elements 10, they may also be replaceable. Element 10 may feature still another plant material transporting element 30. This also may be designed as a replaceable part fixed on plant material pick-up elements 10, or as a unit with them, or it may be replaceably attached to collar 6 if elements 20, as shown in FIGS. 3-7, are used. Plant material transporting elements 30 comprise a plane rising in the counter-rotation direction, and resemble wings. The effect of transporting elements 30 is to produce an air current and to prevent the ground probing and plant material pick-up elements from allowing earth to be mixed into the plant material, even when being loaded onto the collar and transported on up to the rotor together with the plant material. Plant material transporting elements 30 may also serve to lift the plant matertial so that it may be captured by a follow-up machine for further processing while still suspended. Transporting ribs 60 and 25, however, together with fins 62 on the rotor (visible in FIG. 11) create an air current that blows the contaminants out of plant material.

This effect is further enhanced by inclined plane 18 which extends toward the rotor. In the cross section drawings of FIGS. 9 and 10, guide ribs 21 attached to elements 10 are visible on the underside which prevent the digging of elements 10 into the ground, and ensure probing of the ground causing as little as possible mixing of earth with plant material. Depending upon the plant material to be harvested, it is also important to provide leading edge 16 with a suitable radius. This radius is preferably in the range of 1 to 10 mm. The adaptation of the apparatus of this invention to the plant material to be handled may further be achieved by adjusting transporting ribs 60 on the collar. This requires ribs 60 that are approximately flexible and are arranged with adjustable attachment means 61 on collar 6. In the embodiment shown in FIG. 10, elements 10 taper from the collar 6 to leading edge 16.

Figure 11:
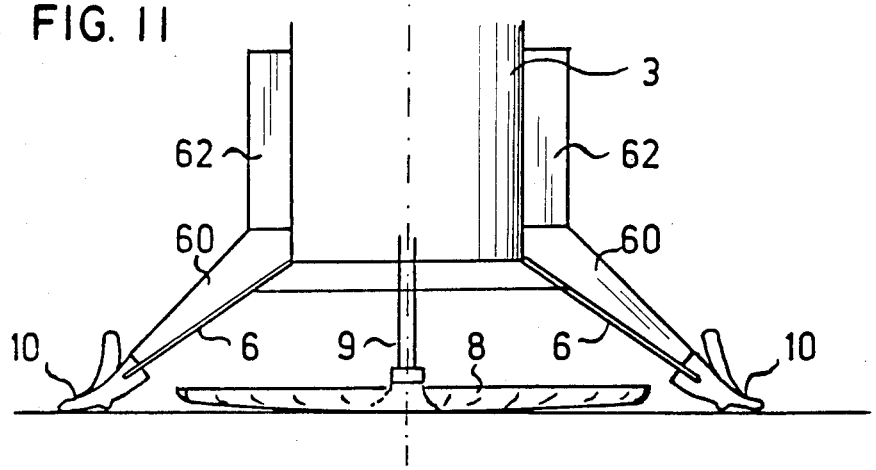
FIG. 11 is a sectional view through a rotor showing an additional ground probing part.
Figure 12:
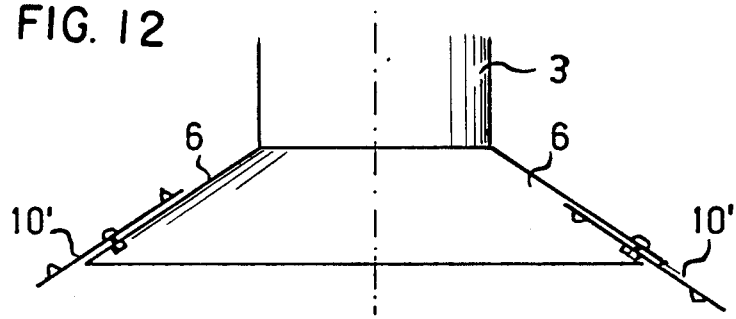
FIG. 12 is a sectional view through a rotor showing ground probing and plant material pick-up elements mounted to pivot on the collar.
Figure 13:
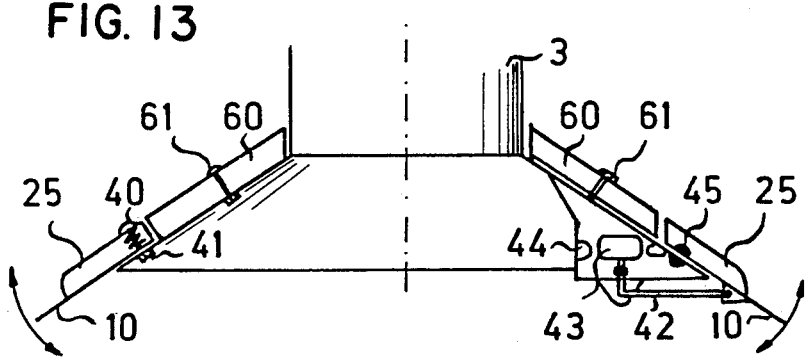
FIG. 13 is a sectional view through a rotor showing elements that can pivot in a plane vertical to the plane of the collar surface.

In FIGS. 11-13 the apparatus is again shown, as in FIG. 2, in a cross section of the vicinity of a rotor. In FIG. 11, relatively large support disk 8 is drawn in cross section and supported on shaft 9. Support disk 8 may be fastened rigidly on shaft 9 and simply function as a guide, or it may be fastened rotatably on the shaft and rotated just by the friction and the unevenness of the ground. It is also possible to drive support disk 8 by gearing 2. Support disk 8 may be upturned at its periphery in the vicinity of the plant material pick-up elements.

Ground probing and plant material pick-up elements 10 correspond to those shown in FIGS. 8-10. Transporting ribs 60 on collar 6 extend from element 10 to rotor 3 and meet fin 62 (FIG. 11) attached to rotor 3. Together with plant transport elements 30, the result is the cleaning effect of the plant material as described above.

The ground probing and plant material pick-up elements may comprise traction driven disk-shaped rotating bodies 10' (FIG. 12) that are mounted rotatably and replaceably on collar 6. Such an embodiment is particularly useful when collar 6 is made of relatively rigid material. Also practical, of course, is the placement of elements 10' on the underside of collar 6, as shown on the right-hand side of FIG. 12.

In FIG. 13, two further variations are shown. The left-hand half of the figure shows a ground probing and plant material pick-up element 10 that can pivot in a plane vertical to collar 6.

For pivotal movement, element 10 is attached movably to the collar by means of compression spring 40 and bolt 41. This movement makes it possible to construct both collar 6 and element 10 from relatively rigid material. The pivotal movement of element 10 thus permits fine ground probing and has the additional effect of transferring motion to the plant material and thereby separating the plant material from mixed-in earth.

The right-hand half of FIG. 13 also shows a ground probing and plant material pick-up element 10 which is pivotable in a plane vertical to the collar. Element 10 is attached by means of bent rod 42 with weight 43 subject to centrifugal force, which can move between limits formed by stops 44. Element 10 is articulated on collar 6 by elastic rubber connecting element 45. The rotary motion of rotor 3 forces weight 43 outward and thus forces ground probing element 10 down to the ground. Even when relatively high speeds of rotation are attained, a correct probing of the ground is thereby assured.

In the embodiments shown here, transporting ribs 25 are arranged parallel to transporting ribs 60.

Elements 10 may, of course, also move vertically with respect to the surface of the collar if the connection of element 10 to collar 6 is by means of a flexible intermediate piece, such as a highly tear resistant plastic strip or fillet.

Also, transporting ribs 25 may be lengthened to extend to collar 6 and thus correspond in their extension to transporting ribs 60.

The apparatus according to the invention first picks up the plant material lying on the ground and then separates the plant material from contaminants. For this purpose, as described above, plant material is lifted high by plant material transporting elements (25, 30, 60). If lifting is provided by wing-like elements 30, plant material is thrown so high that while still suspended in the air, it can be caught by a follow-up device attached to the apparatus of this invention and be immediately further processed.

I claim:

1. Apparatus for picking up and processing plant material lying on the ground with at least one rotor (3) rotating around a vertical axis and having on its bottom a collar (6), to which a plurality of replaceable ground probing and plant material pick-up elements (20) which are subject to wear are arranged and attached adjustably around an attachment point (23) approximately vertical to said collar.

2. Apparatus according to claim 1, wherein said collar (6) to which said elements are attached is flexible.

3. Apparatus according to claim 1, wherein said collar (6) to which said elements are attached is rigid.

4. Apparatus according to claim 1, wherein said collar has on its lower edge outwardly directed fin-shaped projecting parts (14) that are capped by said replaceable ground probing and plant material pick-up elements (20).

5. Apparatus for picking up and processing plant material lying on the ground with at least one rotor (3) rotating around a vertical axis and having on its bottom a collar (6), to which a plurality of replaceable ground probing and plant material pick-up elements (10) are attached, having transporting ribs (25) on the upper surface of said elements (10), and transporting ribs (60) on the upper surface of said collar (6) adjustable around at least one axis approximately vertical to said collar.

6. Apparatus according to claim 5, wherein wing-like plant material transporting elements (30) are attached to said ground probing and plant material pick-up elements (10).

7. Apparatus according to claim 6, wherein said plant material pick-up elements (10) comprise an inclined plane (18) aligned with and rising toward the rear of said transporting elements (30).

8. Apparatus according to claim 7, wherein said plant material transporting elements form a unit with said ground probing and plant material pick-up elements (10).

9. Apparatus according to claim 6 wherein said wing-like plant material transporting elements (30) are arranged near said ground probing and plant material pick-up elements (10) and extend over a surface of said collar to produce an air current.

10. Apparatus according to claim 9, wherein said wing-like transporting elements are removable and replaceable.

11. Apparatus according to claim 6, wherein said ground probing and plant material pick-up and transporting elements operate in combination with a support disk (8) arranged on a central shaft (9) under collar (6).

12. Apparatus according to claim 11, wherein said support disk (8) is mounted fixedly on said central shaft (9) of said rotor (3) and is upturned at its periphery in the vicinity of said plant material pick-up elements.

13. Apparatus according to claim 11, wherein said support disc (8) is mounted rotatably on said central shaft (9) of said rotor (3) and is upturned at its periphery in the vicinity of said plant material pick-up elements.

14. Apparatus according to claim 6, wherein plant material transporting elements (30) are sized to lift the plant material high so that it can be captured by a follow-up machine while still suspended for further processing.

15. Apparatus according to claim 6, wherein vertical fins (62) are provided on said rotor and interact with said transporting ribs (60, 25) to create an air current whereby contaminants are removed from said plant material.

16. Apparatus for picking up and processing plant material lying on the ground with at least one rotor (3) rotating around a vertical axis and having on its bottom a collar (6), to which a plurality of replaceable ground probing and plant material pick-up elements (10') which are subject to wear are arranged and attached, said plant material pick-up elements (10') comprising flat rotating bodies that rotate around pivots penetrating said collar (6) substantially vertically.

* * * * *